(12) United States Patent
Okamura et al.

(10) Patent No.: US 9,316,253 B2
(45) Date of Patent: Apr. 19, 2016

(54) SINTERED BEARING

(75) Inventors: Kazuo Okamura, Kuwana (JP); Fuyuki Ito, Kuwana (JP)

(73) Assignee: NTN CORPORATION, Osaka-shi (JP)

( * ) Notice: Subject to any disclaimer, the term of this patent is extended or adjusted under 35 U.S.C. 154(b) by 851 days.

(21) Appl. No.: 12/864,716

(22) PCT Filed: Jan. 21, 2009

(86) PCT No.: PCT/JP2009/050796
§ 371 (c)(1),
(2), (4) Date: Jul. 27, 2010

(87) PCT Pub. No.: WO2009/104441
PCT Pub. Date: Aug. 27, 2009

(65) Prior Publication Data
US 2010/0310199 A1 Dec. 9, 2010

(30) Foreign Application Priority Data
Feb. 21, 2008 (JP) .................................. 2008-040149

(51) Int. Cl.
*F16C 32/06* (2006.01)
*F16C 33/14* (2006.01)
(Continued)

(52) U.S. Cl.
CPC ............... *F16C 33/14* (2013.01); *B22F 3/164* (2013.01); *B22F 5/106* (2013.01); *F16C 17/107* (2013.01); *F16C 33/107* (2013.01); *B22F 2998/10* (2013.01); *B22F 2999/00* (2013.01); *F16C 2204/10* (2013.01); *F16C 2220/20* (2013.01); *F16C 2240/40* (2013.01); *F16C 2370/12* (2013.01)

(58) Field of Classification Search
CPC ...... F16C 33/14; F16C 33/107; F16C 33/145; F16C 33/104; F16C 2204/10; F16C 2204/12; F16C 2204/30; F16C 2240/42; F16C 2240/40; F16C 2240/44; F16C 2240/48; F16C 17/107; B22F 3/164; B22F 5/106; B22F 2999/00; B22F 2998/10
USPC ................ 384/100, 279, 902; 75/228; 419/23
See application file for complete search history.

(56) References Cited

U.S. PATENT DOCUMENTS

| 4,948,426 A | * | 8/1990 | Kato et al. ........................ 419/23 |
| 5,518,519 A | * | 5/1996 | Kondoh et al. .................. 75/231 |

(Continued)

FOREIGN PATENT DOCUMENTS

| EP | 1118404 A1 * | 7/2001 | .................. B22F 3/20 |
| JP | 9-88960 A | 3/1997 | |

(Continued)

OTHER PUBLICATIONS

International Search Report of PCT/JP2009/050796, mail date Apr. 14, 2009.

(Continued)

*Primary Examiner* — Richard W Ridley
*Assistant Examiner* — Yamilka Pinero Medina
(74) *Attorney, Agent, or Firm* — Westerman, Hattori, Daniels & Adrian, LLP

(57) ABSTRACT

A maximum diameter (d) of each of surface openings formed in a bearing surface through melting of Sn metal powder as a binder is set within a range of 0 µm<d≤25 µm. In order to attain the range, binder metal powder having a maximum particle diameter of 25 µm or less is used.

4 Claims, 5 Drawing Sheets

(51) Int. Cl.
*B22F 3/16* (2006.01)
*B22F 5/10* (2006.01)
*F16C 17/10* (2006.01)
*F16C 33/10* (2006.01)

(56) References Cited

U.S. PATENT DOCUMENTS

| | | | |
|---|---|---|---|
| 5,762,423 | A | 6/1998 | Mori et al. |
| 6,159,266 | A * | 12/2000 | Yoshimura et al. ............ 75/243 |
| 6,357,920 | B1 * | 3/2002 | Mori et al. .................... 384/279 |
| 2002/0085775 | A1 | 7/2002 | Mori et al. |
| 2003/0126945 | A1 * | 7/2003 | Liu et al. ......................... 75/245 |
| 2005/0034558 | A1 * | 2/2005 | Amick ............................. 75/228 |
| 2007/0258668 | A1 * | 11/2007 | Shimizu et al. ................. 384/28 |
| 2008/0081007 | A1 * | 4/2008 | Steele et al. .................. 422/179 |
| 2009/0142010 | A1 | 6/2009 | Ito et al. |

FOREIGN PATENT DOCUMENTS

| | | |
|---|---|---|
| JP | 10-184690 A | 7/1998 |
| JP | 11-062948 A | 3/1999 |
| JP | 2000-240653 A | 9/2000 |
| JP | 2006-189081 A | 7/2006 |
| JP | 2006-348379 A | 12/2006 |
| WO | 2006/073090 A1 | 7/2006 |

OTHER PUBLICATIONS

Notification of Transmittal of Translation of the International Preliminary Report on Patentability (Form PCT/IB/338) of International Application No. PCT/JP2009/050796 mailed Oct. 14, 2010 with Forms PCT/IB/373 and PCT/ISA/237.

* cited by examiner

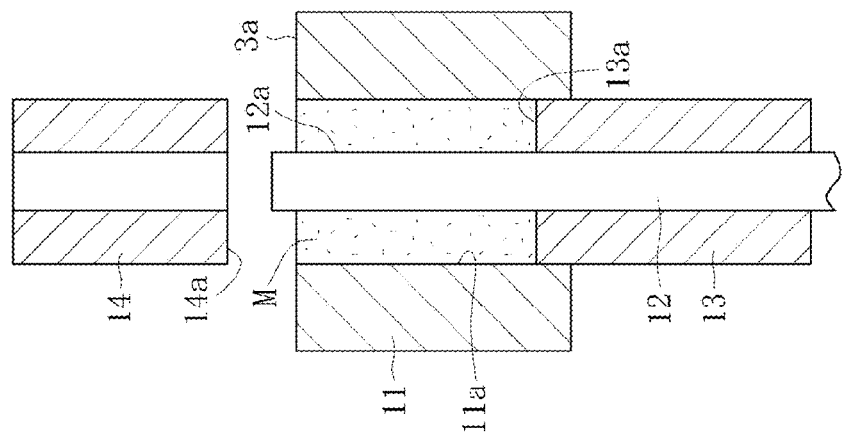
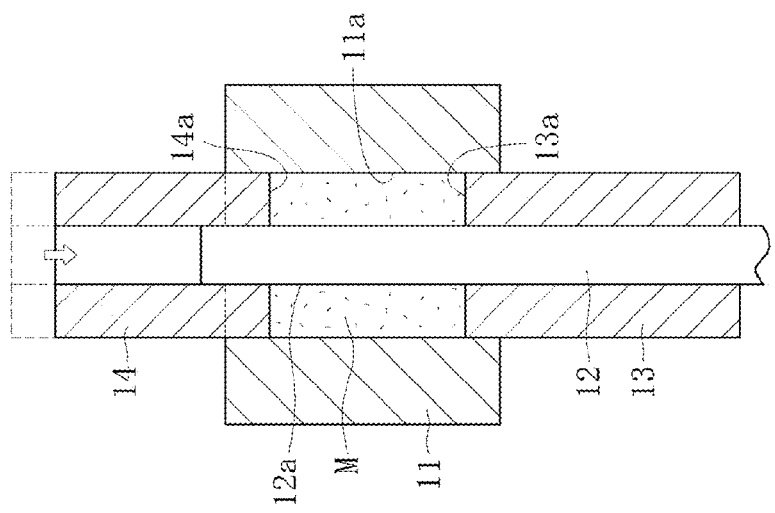
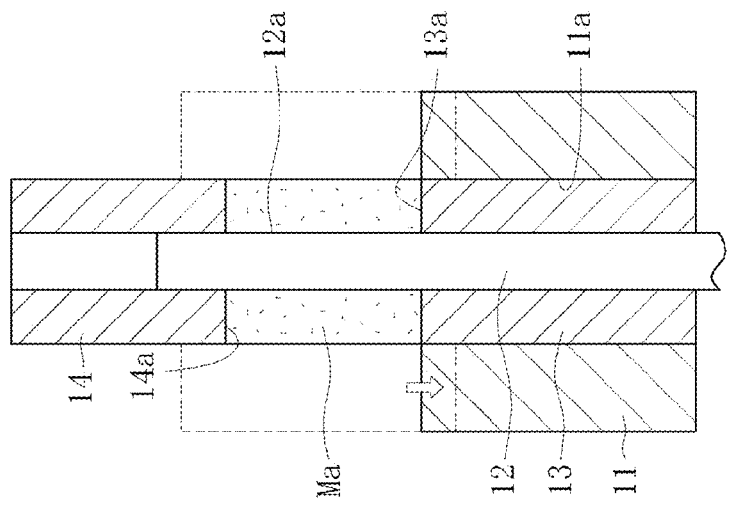

SINTERED BEARING

TECHNICAL FIELD

The present invention relates to a sintered bearing obtained through sintering of metal powder after compression molding thereof.

BACKGROUND ART

A sintered bearing is used with inner holes thereof being impregnated with a lubricating fluid such as a lubricating oil. As relative rotation is performed between the bearing and a shaft to be supported, the lubricating fluid with which it is impregnated oozes out to a sliding portion between the bearing and the shaft to form a lubricating film. Through the intermediation of this lubricating film, the shaft is rotatably supported. The sintered bearing has high rotational speed and is quite, it is suitably used in a portion where a particularly high bearing performance and durability are required, for example, in an automotive bearing component or a motor spindle for an information apparatus.

For example, a sintered bearing disclosed in Patent Document 1 is formed of Cu powder, SUS(Stainless steel) powder, Sn powder, and the like which are mixed at a predetermined rate. The mixed powder is compression-molded into a predetermined shape (cylindrical shape in many cases), and sintered thereafter. In this case, Sn powder having a relatively low melting point is hardened after being molten at the time of sintering, thereby functioning as a binder for coupling Cu powder and SUS powder.

[Patent Document 1] JP 2006-189081 A
[Patent Document 2] JP 11-62948 A

DISCLOSURE OF THE INVENTION

Problems to be Solved by the Invention

In manufacturing the sintered bearing as described above, when Sn powder is molten, holes are formed at a part where the Sn powder has been originally present. In this case, when a particle diameter of the Sn powder is large or the Sn powder is segregated in the mixed powder, holes formed as a result of melting of the Sn powder become larger. When the holes are exposed on the surface of the bearing, in particular, on the bearing surface, a lubricating fluid is liable to infiltrate from the surface openings of the bearing surface into the inside thereof. As a result, a sufficient lubricating film is not formed over the sliding portion, which leads to the risk of generation of defective lubrication. In particular, when the sintered bearing as described above is used in a fluid dynamic bearing device in which a shaft is supported by a dynamic pressure effect of a lubricating film, a so-called dynamic-pressure absence occurs, which represents the displacement of the lubricating film having a pressure increased in accordance with the rotation of the shaft to the inside from the surface openings of the bearing surface. As a result, a sufficient dynamic pressure effect cannot be obtained, which leads to the risk of significant deterioration in bearing performance.

In order to avoid the above-mentioned situation, for example, in the sintered bearing disclosed in Patent Document 2, the hole-sealing treatment such as shot blasting or rotary sizing is effected on the bearing surface, whereby the surface openings in the bearing surface are eliminated. With this treatment, while the infiltration of the lubricating fluid from the surface openings of the bearing surface is suppressed, manufacturing cost of the bearing is sharply increased by additional effecting of the hole-sealing treatment as described above.

An object of the present invention is to reduce the surface openings of the sintered bearing without involving sharp increase in cost, to thereby prevent defective lubrication and deterioration of a dynamic pressure effect.

Means for Solving the Problems

In order to achieve the above-mentioned object, the present invention is a sintered bearing obtained by sintering mixed powder containing main component metal powder and binder metal powder, wherein a maximum diameter d of each of surface openings formed in a bearing surface through melting of the binder metal powder falls within a range of $0\ \mu m < d \leq 25\ \mu m$.

As described above, when the maximum diameter d of the surface openings formed in the bearing surface through melting of the binder metal powder is set to 25 μm or less, the lubricating fluid forming a lubricating film is prevented from being displaced to the inside of the bearing, thereby preventing defective lubrication and deterioration of a dynamic pressure effect. Note that, in the sintered metal, it is normally inconceivable that the maximum diameter of the surface openings formed through melting of the binder metal powder is zero, that is, the surface openings are not formed at all through melting of the binder. Thus, d is set to be larger than zero.

For example, when the binder metal powder having a small particle diameter is used, the size of the holes formed through melting of the binder metal powder is suppressed from being increased. Further, when the binder metal powder having a small particle diameter is used, the binder powder becomes easier to uniformly disperse in the mixed powder. As a result, the situation can be avoided where the binder metal powder is segregated so as to form large holes. FIG. 6 illustrate in an enlarged manner the surface property of the bearing surface of the sintered bearing with use of two types of the binder metal powders different in particle diameter. Specifically, FIG. 6(a) illustrates a sintered bearing (compared product) with use of the Sn powder having the maximum particle diameter of 50 μm or less, and FIG. 6(b) illustrates a sintered bearing (embodiment product of the present invention) with use of the Sn powder having the maximum particle diameter of 25 μm or less. In FIGS. 6(a) and (b), the black portions represent the surface openings. Comparison made between those figures confirms that, meanwhile coarse and large surface openings are formed in the sintered bearing of FIG. 6(a), which is a compared product, the surface openings are small in size and uniformly dispersed in the sintered bearing of FIG. 6(b), which is an embodiment product of the present invention. For this reason, it can be said that, with use of the binder metal powder having the maximum particle diameter of 25 μm or less, the size of the surface openings formed in the bearing surface is suppressed without involving separate steps, that is, without involving sharp increase in cost, to thereby prevent defective lubrication and deterioration of a dynamic pressure effect. Note that, the description of "metal powder having the maximum particle diameter of 25 μm or less" does not intend to completely exclude even a single particle having a particle diameter exceeding 25 μm, but intends to include extremely small amount of particles having a particle diameter exceeding 25 μm, which are contained for some reasons in manufacturing powder. (The same applies to the following description.)

As described above, regardless of the reduction of the particle diameter of the binder metal powder, there is a risk that coarse and large holes are formed between the particles of the main component metal powder when the particle diameter of the main component metal powder is large. In view of this, when the main component metal powder having the maximum particle diameter of 50 μm or less, the metal powder can be sintered in a dense state so as to reduce the gaps between the particles. Thus, the openings in the bearing surface are suppressed, to thereby reliably prevent defective lubrication and deterioration in bearing performance.

Meanwhile, when the particle diameter of the mixed metal powder containing the binder metal powder and the main component metal powder described above is excessively small, there is a risk that the metal powder is less likely to move in a die for green-compact molding of the sintered bearing so that the moldability is lowered. For example, when the sintered bearing is formed with use of the mixed powder including fine powder having a particle diameter less than 10 μm, there is a high risk that the problem as described above arises. Accordingly, it is preferable that the mixed powder having the minimum particle diameter of 10 μm or more be used. In this context, the description of "powder having the minimum particle diameter of 10 μm or larger" does not intend to completely exclude even a single particle having a particle diameter less than 10 μm, but intends to include extremely small amount of particles having a particle diameter less than 10 μm, which are contained for some reasons in manufacturing powder. (The same applies to the following description.)

Further, it is desirable that a mixing rate of the binder metal powder in the mixed powder fall within a range from 0.2 wt % or larger to 10 wt % or less. This is because, when the load of the binder metal powder exceeds 10 wt %, the binder metal powder becomes liable to be segregated, which leads to a risk that large surface openings are formed through melting of the binder metal, and when the load of the binder metal powder is less than 0.2 wt %, the function as a binder for coupling the main component metal powder cannot be fully performed.

In the fluid dynamic bearing device including the sintered bearing as described above and the shaft member inserted along the inner periphery thereof, in which the shaft member is supported by a dynamic pressure effect of a lubricating film generated in a radial bearing gap which is formed between an inner peripheral surface of the sintered bearing and an outer peripheral surface of the shaft member, the dynamic-pressure absence is suppressed, whereby an excellent bearing performance can be exerted.

Effects of the Invention

As described above, according to the present invention, it is possible to reduce the surface openings of the sintered bearing without involving sharp increase in cost to thereby prevent defective lubrication and deterioration of a dynamic pressure effect.

BEST MODE FOR CARRYING OUT THE INVENTION

In the following, an embodiment of the present invention is described with reference to the drawings.

FIG. 1 is a conceptual diagram illustrating a construction example of an information apparatus spindle motor. The spindle motor has a fluid dynamic bearing device 1 provided with a sintered bearing according to an embodiment of the present invention. This spindle motor is used in a disk drive device such as an HDD, and is provided with the fluid dynamic bearing device 1 supporting a shaft member 2 rotatably in a non-contact manner, a disk hub 3 attached to the shaft member 2, and a stator coil 4 and a rotor magnet 5 that are opposed to each other through the intermediation of a radial gap. The stator coil 4 is attached to the outer periphery of a bracket 6, and the rotor magnet 5 is attached to the inner periphery of the disk hub 3. The disk hub 3 retains in its outer periphery one or multiple (two in FIG. 1) disc-like information storage media, such as magnetic disks (hereinafter simply referred to as disks) D. In the spindle motor, constructed as described above, when the stator coil 4 is energized, the rotor magnet 5 is caused to rotate by an exciting force generated between the stator coil 4 and the rotor magnet 5, and with this rotation, the disk hub 3 and the disks D retained by the disk hub 3 rotate integrally with the shaft member 2.

FIG. 2 illustrates the fluid dynamic bearing device 1. The fluid dynamic bearing device 1 is mainly formed of the shaft member 2, a housing 7, a bearing sleeve 8 serving as the sintered bearing according to the present invention, and a seal, member 9. For the sake of convenience in illustration, a bottom portion 7b side of the housing 7 in an axial direction is referred to as the lower side and an opening side is referred to as the upper side.

The shaft member 2 is made of a metal material such as stainless steel, and is provided with a shaft portion 2a and a flange portion 2b provided integrally or separately at the lower end of the shaft portion 2a. On the outer peripheral surface of the shaft portion 2a, there are formed a cylindrical outer peripheral surface 2a1 exposed to radial bearing gaps of radial bearing portions R1 and R2 and a tapered surface 2a2 gradually decreased upward in diameter while being exposed to a seal space S. It is possible to make the entire of the shaft member 2 of metal, or to make the shaft portion 2a of metal and to make the entire or a part (both end surfaces, for example) of the flange portion 2b of a resin.

The housing 7 is formed by injection molding of a crystalline resin such as liquid crystal polymer (LCP), polyphenylene sulfide (PPS), and polyetherether ketone (PEEK), or of a resin composition with a base resin formed of an amorphous resin such as polyphenyl sulfone (PPSU), polyether sulfone (PES), and polyether imide (PEI). The housing 7 has the side portion 7a and the bottom portion 7b which are formed integrally in a cup-like shape. According to the purpose, in the resin composition forming the housing 7, an appropriate amount of the base resin may be used in, for example, a fibrous filler such as glass fiber, a whisker-like filler such as potassium titanate, a scaly filler such as mica, and a fibrous or a powdered conductive filler, such as carbon fiber, carbon black, graphite, carbon nanomaterial, or various kinds of metal powder. The injection material of the housing 7 is not limited to the above-mentioned ones. For example, a low-melting metal material such as a magnesium alloy or an aluminum alloy are useable. Alternatively, the housing 7 can be formed by MIM molding in which the composite of metal powder and binder is injection-molded to be degreased and sintered, press molding of a metal material such as elastic metal including brass, or machine working on a metal material.

Over the entire surface or in a partially ring region of an upper end surface 7b1 of the bottom portion 7b, a region (not shown) in which multiple dynamic pressure grooves are arranged in a spiral fashion is formed as a thrust dynamic pressure generating portion, for example. Those dynamic pressure grooves can be formed simultaneously with, for example, die molding of the housing 7.

The bearing sleeve 8 is a porous body having a cylindrical shape. The bearing sleeve 8 is obtained by sintering of the mixed powder containing the main component metal powder and the binder metal powder after compression-molding thereof. In this embodiment, Cu (or Cu alloy) powder and SUS powder are used as the main component metal powders, and Sn powder is used as the binder metal powder. Further, the surface openings formed in the bearing surface through melting of the Sn powder are set to have the maximum diameter d of 25 μm or less. Note that, whether or not the surface openings as described above are formed through melting of the Sn powder can be estimated by confirming whether or not molten the Sn powder adheres to the main component metal around the surface openings.

In the inner peripheral surface 8a of the bearing sleeve 8, which is a radial bearing surface, there are formed the dynamic pressure grooves as the radial dynamic pressure generating portion. As illustrated, for example, in FIG. 3(a), in this embodiment, there are formed two regions, spaced apart from each other in the axial direction of the inner peripheral surface 8a, in which dynamic pressure grooves 8a1 and 8a2 are arranged in a herringbone-like fashion. The cross-hatched regions of FIG. 3(a) illustrate hill portions protruding to the inner diameter with respect to peripheral regions thereof. In the hill portions, the dynamic pressure grooves 8a1 and 8a2 are provided between the portions thereof extending aslant in a circumferential direction from a ring-shaped smooth portion to both sides in the axial direction. The upper dynamic pressure grooves 8a1 are formed asymmetrically in the axial direction with respect to the ring-shaped smooth portion provided at substantially the center in the axial direction of the upper hill portion. An axial dimension X1 of the upper region with respect to the ring-shaped smooth portion is larger than an axial dimension X2 of the lower region (X1>X2). The lower dynamic pressure grooves 8a2 are formed symmetrically in the axial direction. The region in the axial direction between the regions which are separated in the upper and lower direction and in which the dynamic pressure grooves 8a1 and 8a2 are formed is formed to have the same diameter as that of the dynamic pressure grooves 8a1 and 8a2, and is continuous therewith. In a lower end surface 8c of the bearing sleeve 8, which is a thrust bearing surface, as illustrated in FIG. 3(b), for example, spiral dynamic pressure grooves 8c1 are formed as a thrust dynamic pressure generating portion. Further, in an outer peripheral surface 8d of the bearing sleeve 8, one or multiple axial grooves 8d1 are formed (three in the illustration).

The seal member 9 is made of a resin material or a metal material and into a ring shape. The seal member 9 is arranged along the inner periphery of the upper end portion of a side portion 7a of the housing 7. An inner peripheral surface 9a of the seal member 9 is opposed in the radial direction to a tapered surface 2a2 provided along the outer periphery of the shaft portion 2a, and a wedge-like seal space S gradually decreased downward in radial dimension is formed therebetween. When the shaft member 2 is rotated, the seal space S functions as a capillary force seal and centrifugal force seal, to thereby prevent the lubricating oil inside the bearing from leaking to the outside.

The shaft member 2 is inserted along the inner periphery of the bearing sleeve 8, and the bearing sleeve 8 and the shaft member 2 are accommodated along the inner periphery of the housing 7. Then, the outer peripheral surface 8d of the bearing sleeve 8 is fixed to an inner peripheral surface 7c of the housing 7. In this case, positioning of the bearing sleeve 8 with respect to the housing 7 is performed as follows, for example: First, the lower end surface 8c of the bearing sleeve 8 is brought into contact with an upper end surface 2b1 of the flange portion 2b, and the inner bottom surface 7b1 of the housing 7 is brought into contact with a lower end surface 2b2 of the flange portion 2b. In this manner, thrust bearing gaps exposed to both the end surfaces 2b1 and 2b2 of the flange portion 2b are eliminated. After that, the shaft member 2 is pulled toward the opening of the housing 7 so as to relatively move upward the bearing sleeve 8 by an amount corresponding to the total gap widths of the above-mentioned two thrust bearing gaps. In this state, the bearing sleeve 8 is fixed to the housing 7, whereby the width of each of the thrust bearing gaps is set.

After that, a lower end surface 9b of the seal member 9 is brought into contact with an upper end surface 8b of the bearing sleeve 8, and the seal member 9 is fixed to the inner peripheral surface 7c of the housing 7 in this state. Then, the lubricating oil is filled in the inner space of the housing 7, whereby the assembly of the fluid dynamic bearing device 1 is completed. In this case, the lubricating oil is filled in the inner space (including inner holes of bearing sleeve 8) of the housing 7 sealed by the seal member 9, and the oil surface is maintained within a range of the seal space S.

When the shaft member 2 is rotated, a radial bearing gap is formed between the inner peripheral surface 8a of the bearing sleeve 8 and the outer peripheral surface 2a1 of the shaft portion 2a. Then, the dynamic pressure grooves 8a1 and 8a2 formed in the inner peripheral surface 8a of the bearing sleeve 8 generate a dynamic pressure effect on the lubricating oil in the radial bearing gap. In this manner, the first radial bearing portion R1 and the second radial bearing portion R2 for supporting the shaft member 2 are constituted.

Simultaneously, the thrust bearing gaps are formed between the upper end surface 2b1 of the flange portion 2b and the lower end surface 8c of the bearing sleeve 8, and between the lower end surface 2b2 of the flange portion 2b and the upper end surface 7b1 of the housing bottom portion 7b. Then, the dynamic pressure grooves 8c1 in the lower end surface 8c of the bearing sleeve 8 and the dynamic pressure grooves in the inner bottom surface 7b1 of the housing 7 generate a dynamic pressure effect on the lubricating oil in the thrust bearing gaps. In this manner, a first thrust bearing portion T1 and a second thrust bearing portion T2 for rotatably supporting the flange portion 2b in both the thrust directions are constituted.

In this case, the lubricating oil impregnated inside the bearing sleeve 8 oozes from the surface openings of the radial bearing surface (inner peripheral surface 8a) and the thrust bearing surface (lower end surface 8c), whereby the radial bearing gaps and the thrust bearing gaps can be constantly supplied with sufficient lubricating oil. Further, the lubricating oil flows through the inner space of the bearing, which includes the inner holes of the bearing sleeve 8, whereby the situation can be avoided where the lubricating oil is locally deteriorated. Further, in the present invention, the maximum diameter d of the surface openings of the radial bearing surface and the thrust bearing surface is set to 25 μm or less. As a result, the situation can be avoided where a so-called dynamic-pressure absence occurs, making it possible to exert an excellent bearing performance. In particular, as in this embodiment, in the case where the multiple (two) disks D are mounted to the disk hub 3, a large load is applied to the shaft member 2. Thus, it is preferable that the sintered bearing of the present invention be applied so as to enhance the bearing performance.

Further, the thrust bearing gap of the first thrust bearing portion T1 positioned on the closed side of the housing 7 and the seal space S formed on the opening side of the housing 7 are communicated with each other through an intermediation of an axial groove 8d1. With this structure, for example, the situation where the pressure of the fluid (lubricating oil) on the closed side of the housing 7 is excessively increased or decreased for some reasons can be avoided, and the shaft member 2 can be stably supported in a thrust direction in a non-contact manner.

Further, in this embodiment, the dynamic pressure grooves 8a1 of the first radial bearing portion R1 are formed asymmetrically (X1>X2) in the axial direction (refer to FIG. 3). Therefore, when the shaft member 2 is rotated, a drawing force (pumping force) of the grooves on the upper side of the dynamic pressure grooves 8a1 with respect to the lubricating oil becomes relatively larger than a drawing force of the grooves on the lower side thereof. Then, owing to the differential pressure of the drawing forces, the lubricating oil filled in the gap between the inner peripheral surface 8a of the bearing sleeve 8 and the outer peripheral surface 2a1 of the shaft portion 2a is allowed to flow downward, whereby the lubricating oil inside the bearing can be forcibly circulated. As described above, the lubricating oil is allowed to flow and circulate in the inner space of the bearing device, whereby the pressure balance inside the bearing device can be properly maintained more reliably.

In the following, a manufacturing method for the sintered bearing (bearing sleeve 8) of the present invention is described.

FIG. 4 conceptually illustrate a step of compression-molding mixed metal powder M as a raw material of the bearing sleeve 8 into a predetermined shape (cylindrical shape in the illustration) so as to form a sintered body 15. In the molding apparatus of this embodiment includes a die 11, a core rod 12, a lower punch 13, and an upper punch 14.

The core rod 12 is inserted along the inner periphery of the die 11, and the lower punch 13, which has the inner periphery along which the core rod 12 is inserted, is inserted along the inner periphery of the die 11. In this case, depending on the position in the axial direction of the lower punch 13 with respect to the die 11, a filling amount of the mixed metal powder M is set to a predetermined value. The mold region (cavity) in which the mixed metal powder M is filled is defined by an inner peripheral surface 11a of the die 11, an outer peripheral surface 12a of the core rod 12, and an upper end surface 13a of the lower punch 13. A predetermined amount of the metal powder M is filled in the mold region (refer to FIG. 4(a)).

In this case, the mixed metal powder M filled in the cavity is obtained by compounding Cu powder and SUS powder as main component metal powder and the Sn powder as binder metal powder. Cu powder and SUS powder to be used have the maximum particle diameter of 50 μm or less (commercially available one having a particle size of −350 mesh, for example). The Sn powder to be used has the maximum particle diameter of 25 μm or less (commercially available one having a particle size of −600 mesh, for example). Further, in order to prevent deterioration in moldability, the mixed metal powder M to be used have the minimum particle diameter of 10 μm or larger. In addition, for the purpose of improving the moldability at the time of compression molding or the sliding properties of the finished product, the mixed metal powder M may be compounded with a solid lubricant such as black lead (graphite). Further, the mixing rate of the Sn powder in the mixed metal powder is set within a range from 0.2 wt % or larger to 10 wt % or less, or preferably, from 2 wt % or larger to 5 wt % or less.

The upper punch 14 is descended in the state illustrated in FIG. 4(a) so as to compress the metal powder M from above in the axial direction (refer to FIG. 4(b)). As described above, the metal powder M filled in the cavity is compressed in the axial direction while being restricted in the radial direction thereof, and is molded as a cylindrical compression-molded body Ma. After that, the die is relatively moved downward with respect to the compression-molded body Ma, whereby the compression-molded body Ma is demolded from the die (refer to FIG. 4(c)).

The compression-molded body Ma demolded from the die as described above is sintered at a predetermined sintering temperature, whereby the sintered body 15 is obtained. It is preferable that the temperature (sintering temperature) in the sintering be 750° C. or higher and 1,000° C. or lower, and be more preferably 800° C. or higher and 950° C. or lower. This is because, there are following risks when the sintering temperature is lower than 750° C., the sintering effect between the powders are insufficient so that the strength of the sintered body is decreased, and when the sintering temperature exceeds 1,000° C., the hardness of the sintered body 15 becomes excessively large so that problems with the moldability of the dynamic pressure grooves arise.

In the inner peripheral surface of the sintered body 15 which has been subjected to the above-mentioned sizing step, the dynamic pressure grooves 8a1 and 8a2 illustrated in FIG. 3 are formed by die molding. In the following, with reference to FIG. 5, there is described an example of the die forming process of the dynamic groove (dynamic pressure groove sizing) with respect to the sintered body 15. In this dynamic pressure groove molding step, onto an inner peripheral surface 15a of the sintered body 15, the forming die having a shape corresponding to the regions of the finished product, in which the dynamic pressure grooves 8a1 and 8a2 are formed, is pressurized, whereby the dynamic pressure grooves 8a1 and 8a2 are molded. As illustrated in FIG. 5(a), the working apparatus used in this dynamic pressure groove molding step includes a die 16, a core rod 17, an upper punch 18, and a lower punch 19.

As illustrated in FIG. 5(b), for example, recessed forming dies 17a are provided in the outer periphery of the core rod 17. The forming dies 17a are conformed to the shape of the hill portions (cross-hatched regions of FIG. 3(a)) between the dynamic pressure grooves 8a1 and 8a2 provided in the inner peripheral surface 8a of the bearing sleeve 8 which is a finished product. A depth H of the recesses of the forming dies 17a is comparable with the depth (that is, height of the hill portion) of the dynamic pressure grooves 8a1 and 8a2 to be molded. Note that, while the depth of the recesses of the forming dies 17a normally ranges from several μm to several tens of μm, and therefor is subtle when compared with the dimensions of other components, FIG. 5 illustrate the depth in an exaggerated manner for facilitating the understanding thereof.

In this dynamic pressure groove molding step, first, as illustrated in FIG. 5(a), the sintered body 15 is placed on the lower punch 19. In this state, as illustrated in FIG. 5(b), the core rod 17 is inserted along the inner periphery of the bearing sleeve 8 from above so that the upper punch 18 and the lower punch 19 restrict both the end surfaces 8b and 8c of the bearing sleeve 8. In this case, between the inner peripheral surface 15a of the sintered body 15 and protrusions of the forming dies 17a of the core rod 17, an inner diameter gap G is present. After that, as illustrated in FIG. 5(c), the sintered body 15 is press-fitted along the inner periphery of the die 16, whereby the sintered body 15 is deformed with the pressure received from the die 16 and the upper and lower punches 18 and 19 so as to be subjected to sizing in the radial direction. In accordance therewith, the inner peripheral surface 15a of the sintered body 15 is brought into pressure-contact with the forming dies 17a of the core rod 17, and the surface portion from the inner peripheral surface 15a to a predetermined depth is subjected to plastic deformation so as to adhere to the forming dies 17a. As a result, the shape of the recesses of the forming dies 17a is transferred onto the inner peripheral surface 15a of the sintered body 15, whereby the dynamic pressure grooves 8a1 and 8a2 are formed.

After the completion of the above-mentioned step, as illustrated in FIG. 5(d), the die 16 is allowed to descend while the axially restricted state with the upper and lower punches 18 and 19 is maintained, and the sintered body 15 is pulled out from the die 16, whereby the pressure in the radial direction is released. In this case, spring back in the radial direction occurs to the sintered body 15, and the inner peripheral surface 15a of the sintered body 15 is separated from the outer peripheral surface 17a of the core rod 17. As a result, the core rod 17 comes to be detachable, and hence the core rod 17 is pulled out from the sintered body 15, whereby the bearing sleeve 8 is completed.

The bearing sleeve 8 thus formed is molded with, use of fine binder metal powder having the maximum particle diameter of 25 μm or less, and hence the formation of coarse and large holes having a diameter exceeding 25 μm in the surface thereof can be suppressed. With this structure, it becomes unnecessary to effect the hole-sealing treatment such as rotary sizing on the bearing surface 8a of the bearing sleeve 8, and hence simplification and cost reduction in manufacture can be achieved. Note that, the hole-sealing treatment is not necessarily omitted. Without any problem with manufacturing efficiency or cost, the hole-sealing treatment such as rotary sizing or shot blasting may be effected on the bearing surface 15a of the sintered body 15 prior to dynamic pressure groove sizing. In this case, the surface openings in the bearing surface can be further decreased, whereby bearing performance can be further enhanced.

While an embodiment of the present invention has been described above, the present invention is not limited to the embodiment. Note that, in the following description, the portions having the same structure and function as those of the above-mentioned embodiment are denoted by the same reference symbols, and description thereof is omitted.

While in the embodiment described above, the case is illustrated where Cu powder and SUS powder are used as main component metal powder serving as a material of the bearing sleeve 8, the main component metal powder is not limited thereto. For example, other Fe powder, Cu—Zu powder, and the like can be used. Further, while the case is illustrated where the Sn powder is used as binder metal powder, the binder metal powder is not limited thereto. For example, Sb and Zn can be used.

Further, while in the embodiment described above, the herringbone dynamic pressure grooves 8a1 and 8a2 are formed as a radial dynamic pressure generating portion, the shape is not limited thereto. For example, spiral dynamic pressure grooves, a step bearing, or a multi-arc bearing may be adopted. Alternatively, without the provision of the dynamic pressure generating portion, a so-called cylindrical bearing in which the outer peripheral surface 2a1 of the shaft portion 2a and the inner peripheral surface 8a of the bearing sleeve 8 form a cylindrical surface may be structured.

Still further, while in the embodiment described above, the spiral dynamic pressure grooves are formed as a thrust dynamic pressure generating portion, the shape is not limited thereto. For example, herringbone dynamic pressure grooves, a step bearing, or a corrugated bearing (with a corrugated step form) may be adopted.

Yet further, in the embodiment described above, the dynamic pressure generating portions are formed in the inner peripheral surface 8a and the lower end surface 8c of the bearing sleeve 8, and in the upper end surface 7b1 of the housing bottom portion 7b. However, the dynamic pressure generating portions may be provided in the surfaces respectively opposed thereto through an intermediation of the bearing gaps, that is, in the outer peripheral surface 2a1 of the shaft portion 2a, and the upper end surface 2b1 and the lower end surface 2b2 of the flange portion 2b.

Yet further, while in the embodiment described above, being provided separately from each other in the axial direction, the radial bearing portions R1 and R2 may be continuously provided in the axial direction. Alternatively, only any one of the radial bearing portions R1 and R2 may be provided.

Yet further, while in the embodiments described above, a lubricating oil is exemplified as the fluid filling the interior of the fluid dynamic bearing device 1 and generating a dynamic pressure effect in the radial bearing gap and the thrust bearing gap, it is also possible to use some other fluid capable of generating a dynamic pressure effect in each bearing gap, for example, a gas such as air, a magnetic fluid, or a lubricating grease.

Yet further, the fluid dynamic bearing device manufactured by the method of the present invention can be suitably used not only in a spindle motor of a disk drive device such as an HDD as described above, but also in the following: a small motor for an information apparatus, which is used under high-speed rotation, such as a spindle motor for driving an optical disk including a magneto-optical disk; a polygon scanner motor of a laser beam printer; a fan motor of an electronic apparatus; and the like.

BRIEF DESCRIPTION OF THE DRAWINGS

FIG. 4a A sectional view illustrating a molding step of a sintered body.

FIG. 4b A sectional view illustrating a molding step of the sintered body.

FIG. 4c A sectional view illustrating a molding step of the sintered body.

Figure 1:
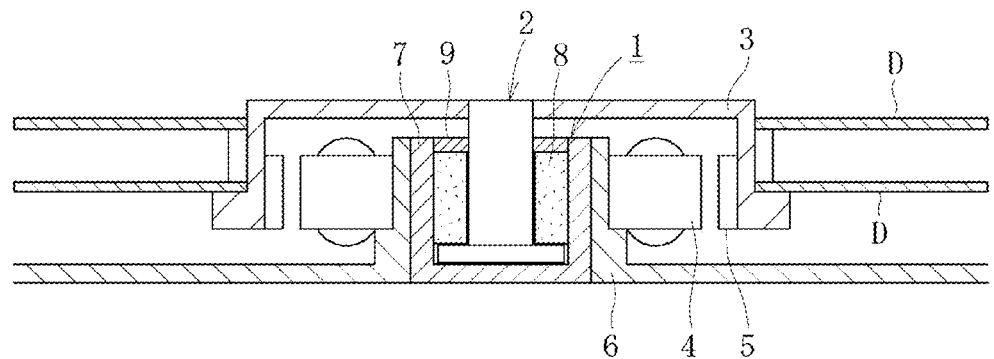
FIG. 1 A sectional view of a motor having a fluid dynamic bearing device 1 incorporated therein.
Figure 2:
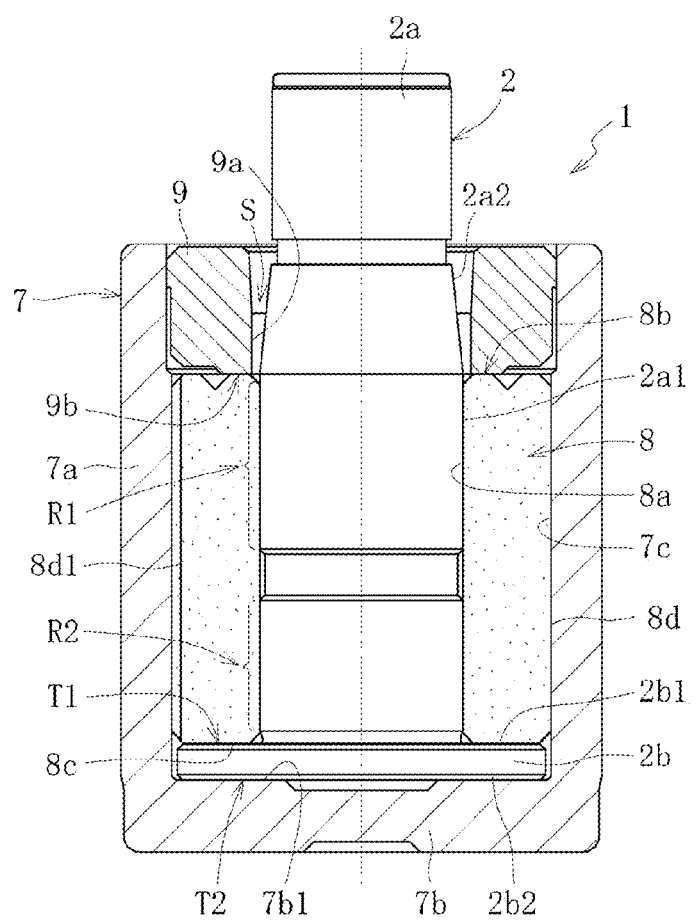
FIG. 2 A sectional view of the fluid dynamic bearing device 1.
Figure 3A:
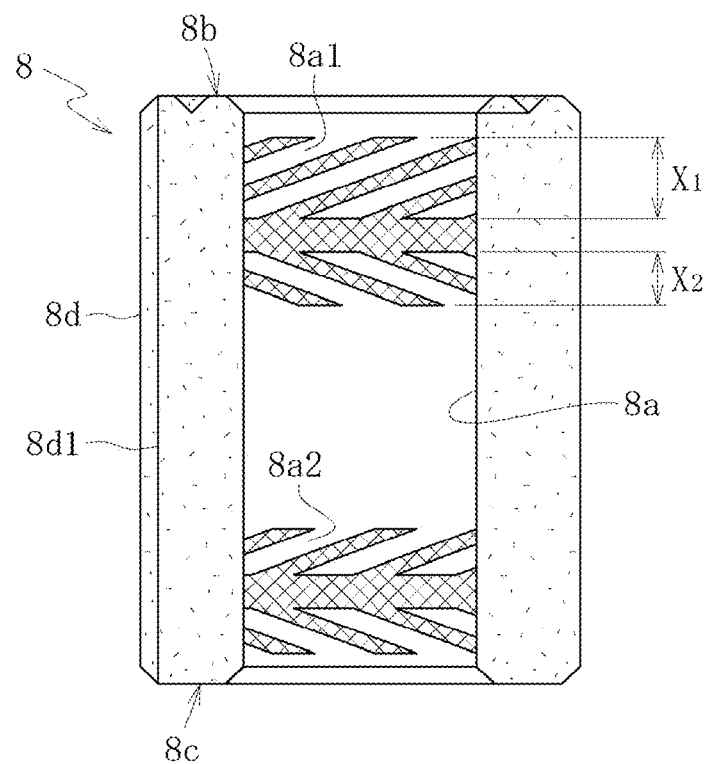
FIG. 3a A sectional view of a bearing sleeve 8.
Figure 3B:
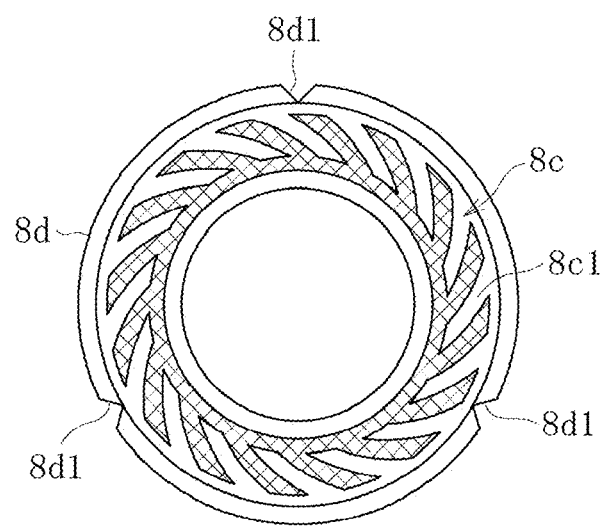
FIG. 3b A bottom view of the bearing sleeve 8.
Figure 5A:
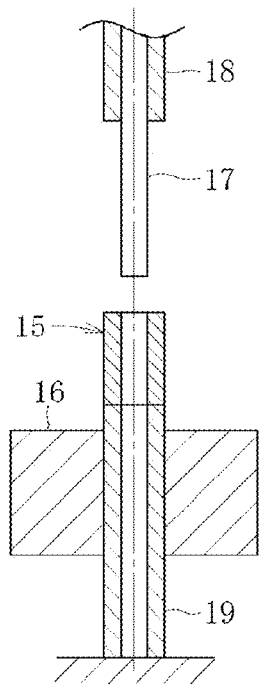
FIG. 5a A sectional view illustrating a groove-sizing step of the bearing sleeve.
Figure 5B:
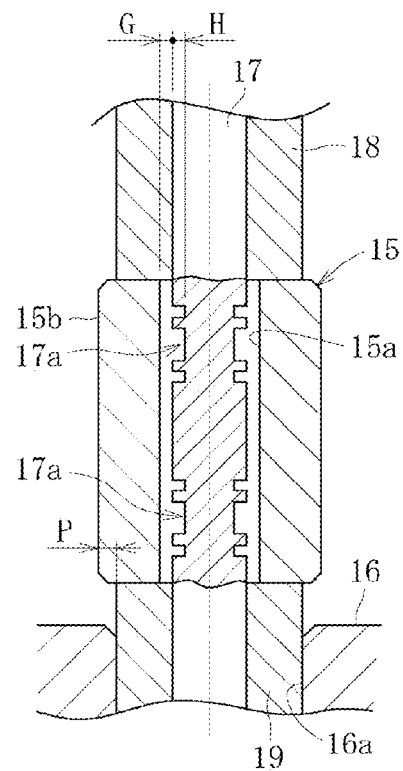
FIG. 5b A sectional view illustrating a groove-sizing step of the bearing sleeve.
Figure 5C:
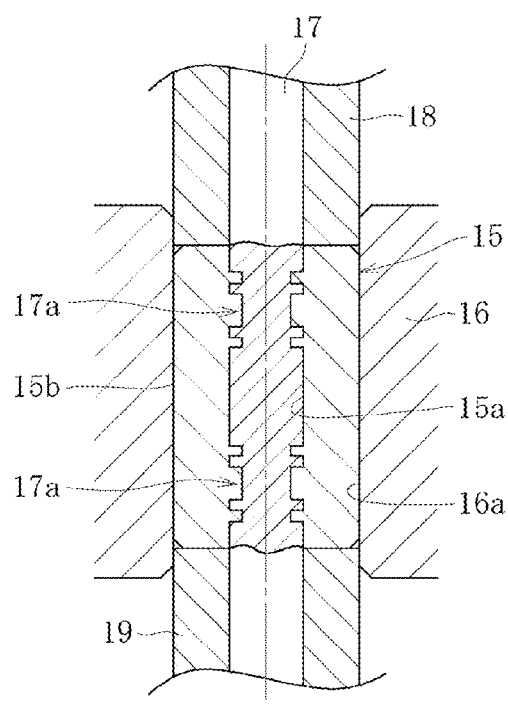
FIG. 5c A sectional view illustrating a groove-sizing step of the bearing sleeve.
Figure 5D:
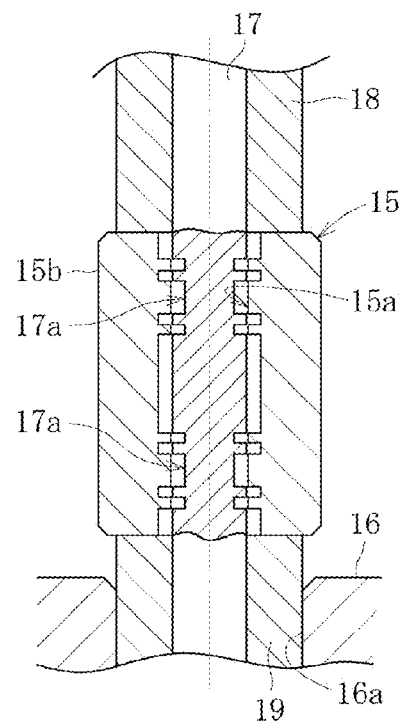
FIG. 5d A sectional view illustrating a groove-sizing step of the bearing sleeve.
Figure 6A:
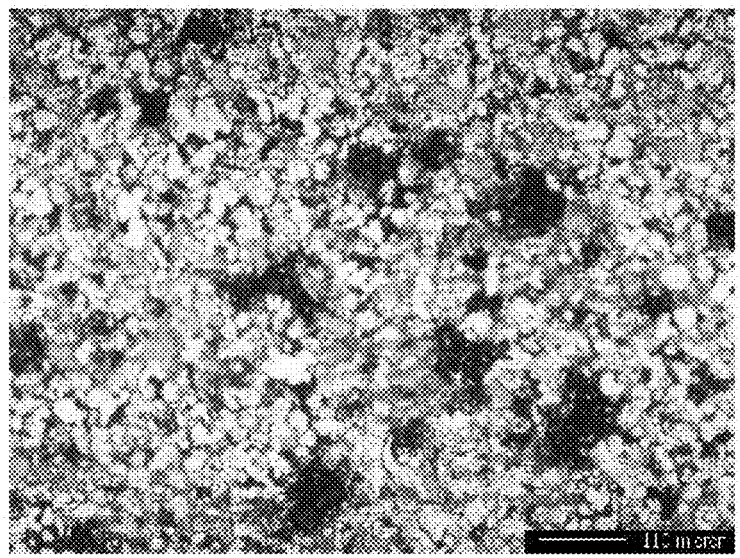
FIG. 6a An enlarged plan view illustrating surface property of a sintered bearing as a compared product.
Figure 6B:
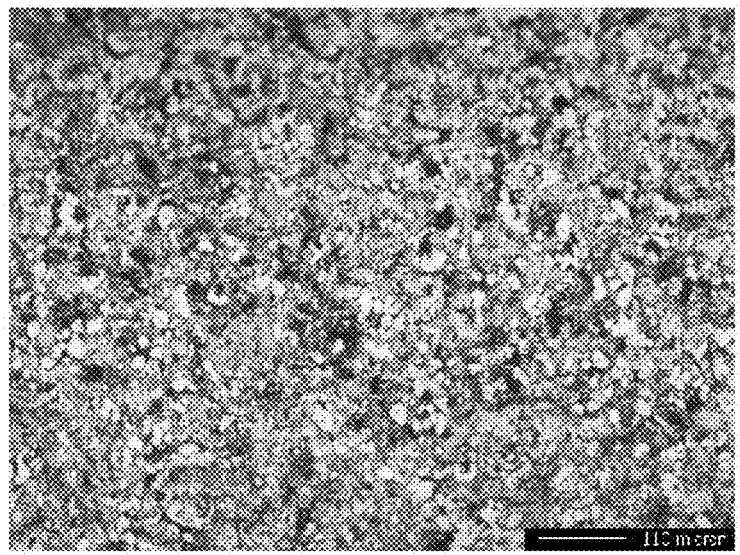
FIG. 6b An enlarged plan view illustrating surface property of a sintered bearing as an embodiment product of the present invention.

DESCRIPTION OF REFERENCE SYMBOLS 1 fluid dynamic bearing device
2 shaft member
3 disk hub
4 stator coil 5 rotor magnet
6 bracket
7 housing
8 bearing sleeve (sintered bearing)
9 seal member
R1, R2 radial bearing portion
T1, T2 thrust bearing portion
S seal space

The invention claimed is:

1. A sintered bearing obtained by sintering mixed powder containing main component metal powder and binder metal powder, wherein the main component metal powder has a higher melting point than the sintering temperature, and the binder metal powder has a lower melting point than the sintering temperature,
the sintered bearing comprising inner holes impregnated with a lubricating oil,
wherein a maximum diameter d of each of surface openings formed in a bearing surface falls within a range of 0 μm<d≤25 μm,
wherein a maximum particle diameter of the binder metal powder is from 10 μm to 25 μm,
wherein a maximum particle diameter of the main component metal powder is greater than the maximum particle diameter of the binder metal powder, and
wherein a minimum particle diameter of the mixed powder is more than 10 μm.

2. The sintered bearing according to claim 1, wherein a maximum particle diameter of the main component metal powder is from 10 μm to 50 μm.

3. The sintered bearing according to claim 1, wherein a mixing rate of the binder metal powder in the mixed powder falls within a range from 0.2 wt % or larger to 10 wt % or less.

4. A fluid dynamic bearing device, comprising:
the sintered bearing according to any one of claims 1, 2 and 3; and
a shaft member inserted along an inner periphery of the sintered bearing,
wherein the shaft member is supported by a dynamic pressure effect of a lubricating film generated in a radial bearing gap which is formed between an inner peripheral surface of the sintered bearing and an outer peripheral surface of the shaft member.

* * * * *